July 31, 1951 W. CARR 2,562,413
HOOK RETRIEVER
Filed May 5, 1949
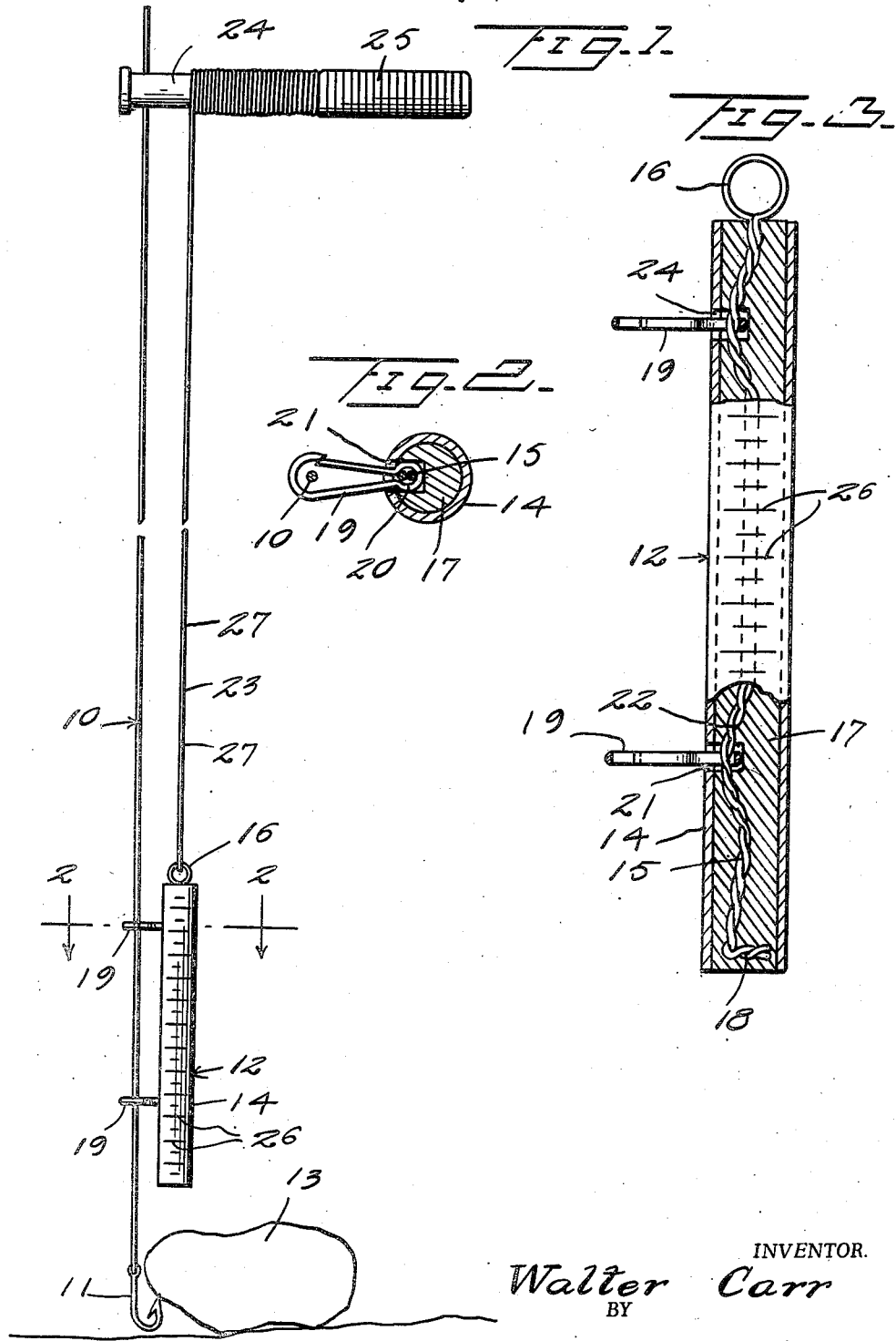
INVENTOR.
Walter Carr
BY
Kimmel & Crowell ATTORNEYS

Patented July 31, 1951

2,562,413

UNITED STATES PATENT OFFICE 2,562,413

HOOK RETRIEVER

Walter Carr, Kilgore, Tex.

Application May 5, 1949, Serial No. 91,569

1 Claim. (Cl. 43—17.2)

This invention relates to means for retrieving snagged hooks.

An object of this invention is to provide a hook retrieving means whereby a snagged hook may be released from an obstruction without injury to the hook or lure and without breaking of the fish line. In the carrying out of this invention a weighted releasing member is slidingly engaged with a fish line and the latter is held substantially taut so as to form a guide for the releasing member. The releasing member may be used either as a striker to break the obstruction, or as a weight acting in a downward direction to effect release of the hook or lure.

Another object of this invention is to provide a hook retrieving means which includes a pair of snap hooks whereby the device may be easily and quickly mounted on or removed from the fish line.

With the above and other objects in view, my invention consists in the arrangement, combination and details of construction disclosed in the drawing and specification, and then more particularly pointed out in the appended claim.

In the drawing:

Figure 1 is a detailed side elevation of a hook retrieving means constructed according to an embodiment of this invention, showing the device in the applied position.

Figure 2 is a cross-sectional view taken on the line 2—2 of Figure 1.

Figure 3 is a detailed side elevation partly in section of the hook releasing member.

Referring to the drawing, the numeral 10 designates a fish line having a hook 11, which is shown as being engaged with an obstruction 13. In order to provide a means whereby the hook 11 may be disengaged from the obstruction 13, I have provided a weighted releasing member generally designated as 12. The releasing member 12 includes an elongated outer metal tubular portion 14 having apertures 21 and 24 therein, to be more fully described hereinafter, said tubular portion having therein a twisted wire 15 formed at its upper end with a ring or eye 16 which projects above the tube or casing 14.

The wire 15 is embedded in a lead body or weight 17 provided with recesses 30, 31 which are aligned with the apertures 21, 24, in tubular outer portion 14, and the wire 15 passes through said recesses and is bent angularly at its lower end as indicated 18, so as to prevent it from being pulled through the body 17. A pair of snap hooks 19 having looped inner extremities or eyes 20 are loosely disposed about the wire 15 in the recesses 30, 31 in such a manner as to project through the apertures 21, 24, formed in the tube or casing 14, as shown in Figure 3. These snap hooks 19 loosely surround the embedded wire 15, so that they may have movement relative to the casing or tube 14.

The ring 16 has secured thereto, one end of elongated cord 23, which is wound around a drum or a reel 24 carried by a ribbed handle 25.

In the use and operation of this device, when the hook 11 is engaged with an obstruction such as obstruction 13, and cannot readily be released therefrom, the releasing member 12 is snapped onto a line 10. The snap hooks 19 are loosely engaged about the line 10 which forms a guide, and the reel 24 is turned in an unwinding direction to permit the releasing member 12 to drop downward along one side of line 10 while the latter is held substantially taut. The releasing member 12 may be lowered to a point adjacent the hook 11 and obstruction 13, and if the releasing member 12 can slide past the obstruction 13, and drop therebelow, the weighted releasing member 12 will be able to pull hook 11 from the obstruction.

However, if releasing member 12 cannot extend below hook 11 releasing member 12 may be vertically reciprocated so as to break obstruction 13, or gradually disengage the hook therefrom. This device will provide a simple means for releasing snagged hooks, and has been found in practice to be capable of releasing practically every snagged hook without injury to the hook, lure or other means disposed in the line 10.

The tubular member 14 has graduations 26 on the outer surface thereof for use in measuring the length of fish, and the cord 23 also has foot indications 27 thereon for use in determining the depth of water. Preferably the indications 27 are formed by waterproof enamel with every fifth indication of a different color from the remaining indications. The handle 25 and the reel 24 are preferably made out of wood so that if the retriever is dropped in the water the handle and reel will float to the surface.

What is claimed is:

A hook retrieving means comprising an elongated body member having an outer elongated tubular portion provided with a plurality of spaced apertures therein, a weight fixedly positioned in said tubular member, said weight having recesses therein aligned with said apertures, a wire embedded in said weight extending longitudinally therethrough and passing through said recesses, said wire having an eye formed at one end thereof exteriorly of said weight, and snap hooks adapted to releasably receive a line and having looped inner extremities, said extremities extending through said apertures into said recesses, the looped extremities thereof loosely surrounding said wire to permit limited lateral and vertical movement of said snap hooks.

WALTER CARR.

REFERENCES CITED

The following references are of record in the file of this patent:

UNITED STATES PATENTS

| Number | Name | Date |
| --- | --- | --- |
| 816,262 | Soper | Mar. 27, 1906 |
| 2,184,589 | Griffith | Dec. 26, 1939 |
| 2,316,500 | Bray | Apr. 13, 1943 |
| 2,353,357 | Paulick | July 11, 1944 |
| 2,399,298 | Sevengny | Apr. 30, 1946 |